United States Patent [19]

Schreiber et al.

[11] 4,155,807

[45] May 22, 1979

[54] CORE AND TRANSITION FUEL ASSEMBLY FOR A NUCLEAR REACTOR

[75] Inventors: Richard E. Schreiber, Monroeville; David J. Sperhac, West Homestead, both of Pa.

[73] Assignee: Westinghouse Electric Corp., Pittsburgh, Pa.

[21] Appl. No.: 725,216

[22] Filed: Sep. 22, 1976

[51] Int. Cl.² ............................................. G21C 3/30
[52] U.S. Cl. ........................................ 176/78; 176/75
[58] Field of Search ....................... 176/78, 76, 74, 75, 176/73, 94

[56] References Cited

U.S. PATENT DOCUMENTS

| | | | |
|---|---|---|---|
| Re. 28,079 | 7/1974 | Andrews | 176/78 |
| T921,019 | 4/1974 | Barry | 176/78 |
| 3,368,945 | 2/1968 | Keller | 176/78 |
| 3,377,254 | 4/1968 | Frisch | 176/78 |
| 3,379,619 | 4/1968 | Andrews | 176/78 |
| 3,753,855 | 8/1973 | Donck | 176/78 |

OTHER PUBLICATIONS

Euronuclear, vol. 3, No. 3, Mar. 1966, pp. 129-130.

*Primary Examiner*—Samuel W. Engle
*Assistant Examiner*—Donald P. Walsh
*Attorney, Agent, or Firm*—Edward L. Levine; Z. L. Dermer

[57] ABSTRACT

A core and a transition fuel assembly for a nuclear reactor having a first fuel assembly including structure for laterally spacing parallel and coextending fuel rods positioned at preselected core elevations and also having a second fuel assembly including lateral spacing structure at preselected core elevations, at least one of which is different than the elevations of the spacing structure of the first fuel assembly. The transition fuel assembly is positioned between the first and second assemblies and includes lateral spacing structure positioned at each core elevation where the first and second fuel assemblies have a spacing structure. The transition fuel assembly ensures that contact among the fuel assemblies of the core is through the spacing structures.

9 Claims, 9 Drawing Figures

|   |   |   |   | A | A | A | A | A | A | A |   |   |   |
|---|---|---|---|---|---|---|---|---|---|---|---|---|---|
|   |   | A | A | A | C | A | C | A | C | A | A |   |   |
|   | A | A | B | C | B | C | B | C | B | C | B | A | A |
|   | A | B | B | B | C | B | C | B | C | B | B | B | A |
| A | A | C | B | C | B | C | B | C | B | C | B | C | A | A |
| A | C | B | C | B | C | B | C | B | C | B | C | B | C | A |
| A | A | C | B | C | B | C | B | C | B | C | B | C | A | A |
| A | C | B | C | B | C | B | C | B | C | B | C | B | C | A |
| A | A | C | B | C | B | C | B | C | B | C | B | C | A | A |
| A | C | B | C | B | C | B | C | B | C | B | C | B | C | A |
| A | A | C | B | C | B | C | B | C | B | C | B | C | A | A |
|   | A | B | B | B | C | B | C | B | C | B | B | B | A |
|   | A | A | B | C | B | C | B | C | B | C | B | A | A |
|   |   | A | A | A | C | A | C | A | C | A | A |   |   |
|   |   |   |   | A | A | A | A | A | A | A |   |   |   |

FIG. 4

CORE AND TRANSITION FUEL ASSEMBLY FOR A NUCLEAR REACTOR

BACKGROUND OF THE INVENTION

1. Field of the Invention

This invention relates to nuclear reactor cores and more particularly to core fuel assemblies which include fuel rods laterally positioned by spacing structures or grids along the assembly length.

2. Description of the Prior Art

Most liquid cooled nuclear reactors include fuel assemblies comprising nuclear fuel contained in a multiplicity of elongated cladding tubes to form fuel rods. The cladding is typically of stainless steel or zirconium alloy material, or other materials which have a relatively low neutron absorption cross section. The rods may be as long as 10 to 16 feet or more in length. To maintain proper lateral alignment among the plurality of parallel and coextending fuel rods in each fuel assembly, spacing devices are used. The spacing devices utilized typically include wire wrapping of the rods or grid structures positioned at preselected positions along the assembly length. Although many varying grid types exist, they generally comprise an "egg-crate" type structure, through which the fuel rods are inserted. The number of grids utilized may vary with the design of individual fuel assemblies. The spacing structures, or grids, also function to alleviate rod-to-rod contact among rods of the same assembly and also among rods of adjacent assemblies. Typical grid structures are described and shown in U.S. Pat. Nos. 3,379,617 and 3,379,619, both issued in the name of H. N. Andrews et al.

There is a strong economic and efficiency incentive to minimize the lateral surface area and the grid material in any one assembly. The grids, even though typically comprised of a low neutron absorbing material, such as alloys of zirconium, do absorb neutrons and detract from reactor efficiency. Minimizing this neutron poisoning effect lowers the cost of electric power. With increasing reactor fuel technology, and increased fuel operating experience, fuel assembly designs may change to lessen or increase the number of grids incorporated in a fuel assembly in a given core. For example, fuel in operating reactors today that contains seven grids along the length of the fuel assembly may, in the near future, be designed with eight or nine grids, or less than seven grids. As the grids are spaced along the assembly length at optimum structural or reactivity locations, the elevation of grids in a seven grid assembly will necessarily be different than the elevation of at least some of the grids in an eight grid assembly.

It is critical to ensure that any contact among assemblies is of a grid-to-grid variety, as opposed to rod-to-rod or rod-to-grid contact. If grid-to-grid contact is not maintained, there is a likelihood or fretting damage or coolant flow starvation at the contact point of a rod with another rod, or another grid. This flow starvation could create a local hot spot leading to local rod melting. This further could lead, in the extreme case, to formation of a hole in the rod cladding thereby allowing reactor coolant to contact the fuel and also allowing the nuclear fuel and fission products to enter the reactor coolant. Any coolant exposed to the reactor fuel creates concerns regarding radiation levels within the plant and potential environmental releases. Also, unmatched elevations of grids in adajcent assemblies can cause local coolant flow starvation and increased assembly vibration, as a result of induced coolant cross-flow. Coolant passing through an assembly tends to discharge radially upon approaching a flow restriction such as a grid. If there is no grid, or other spacing structure, at the corresponding elevation of an adjacent assembly, this may result in local flow starvation at a point just above the grid in the assembly from which the coolant is discharging radially, and, due to the high coolant velocity, also vibrate the adjacent assembly. Further, one of the most critical factors in the design of a reactor core is the spacing among the fuel rods and the fuel assemblies. Improper spacing, through improper grid-to-grid contact, could also lessen the efficiency of reactor operation or create local high power areas in the core. In addition to potential rod failure due to local hot spots, the high axial velocity of reactor coolant within the reactor core tends to vibrate the fuel rods. If proper lateral alignment is not maintained by the grid structures, the rods may sporadically contact the rods or grids of an adjacent assembly, which could lead to fretting over the period of reactor operation. The eventual result may similarly be the entrance of the fuel or fission products into the reactor coolant. The aligned grids may also perform similar functions under assumed accident conditions, such as seismic loading.

For these reasons, it is imperative that grid-to-grid contact be maintained among adajcent assemblies, while minimizing the amount of neutron poisonous or parasitic material in the core. To assure this, apparatus is required during the operating cycles when the changeover from for example, seven grid assemblies to eight grid assemblies is being performed. The apparatus must be compatible with both eight grid and seven grid type assemblies, while minimizing the amount of parasitic material placed in the core. Further, it should be adaptable to existing refueling techniques. It should also minimize any effect on the manufacturing process so as not to unduly increase the cost of nuclear fuel and hence power generation.

SUMMARY OF THE INVENTION

This invention provides a transition nuclear fuel assembly which allows reactor operation with fuel assemblies in a core which fuel assemblies include spacing structures, such as grids, at different core elevations. It does so in a fashion that does not unduly add neutron parasitic material to the core, is consistent with current refueling requirements, maintains grid-to-grid contact between adjacent assemblies, and does not pose undue restrictions economically or technically to the fuel manufacturing process. The transition fuel assembly may be identical to the old and newer assemblies in a reactor core, differing only in the grid elevation and number. It may also include grids that are extended over a greater axial length along the assembly. The basic principle of the transition assembly is that it contains a spacing structure or extension thereof, or a partial spacing or grid-like structure affixed to the assembly structure, located at each elevation where there is a spacing structure in an adjacent assembly in the reactor core. These spacing or grid structures, therefore, may be identical to the other grids of the fuel assemblies, or may be similar with extended outer straps, or can be auxiliary grids of less material than a standard grid, affixed to the fuel assembly structure through thimble tubes and sleeves, extended outer straps, or other such means which maintain proper rod position and grid-to-grid contact. The type and number of grid or spacing structures in a transition assembly will vary dependent upon grid core elevation and number in the other fuel assemblies in a given core.

BRIEF DESCRIPTION OF THE DRAWINGS

The functions and advantages of this invention will become more apparent from the following description and accompanying drawings, in which:

FIG. 4 is a schematic representation of a three-region core;

DESCRIPTION OF THE PREFERRED EMBODIMENTS

Figure 1:
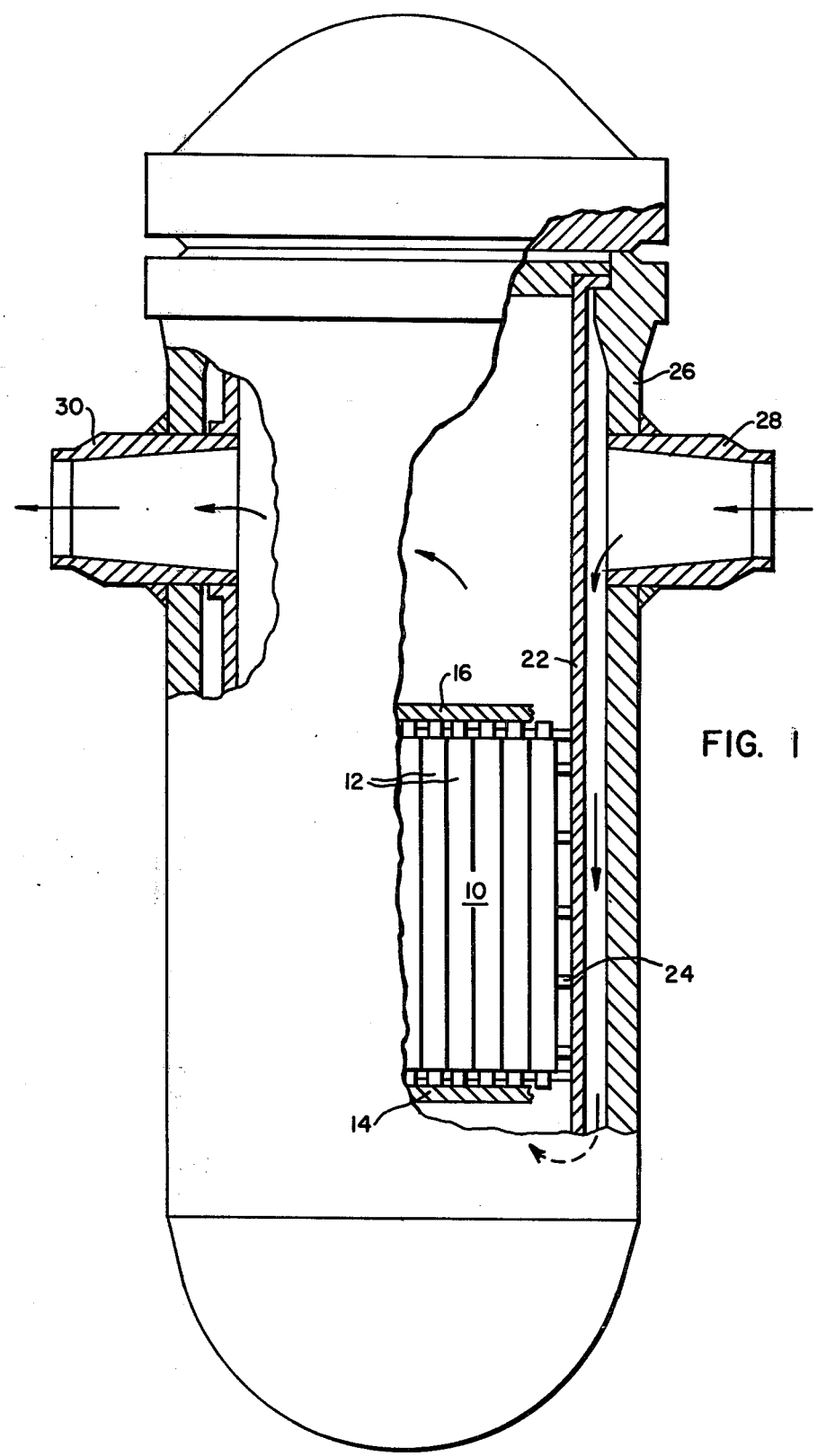
FIG. 1 is a simplified schematic of a nuclear core contained within a pressure vessel.

As shown in FIG. 1, the core 10 of a nuclear reactor is typically made up of a plurality of elongated fuel assemblies 12. In a typical pressurized water reactor (PWR), for example, the assemblies 12 are supported at the bottom by a lower core plate 14 and are supported at the top by an upper core plate 16. These plates 14, 16 are simple supports for the assemblies 12, generally including a pin-in-hole 17 configuration, which fix axially and radially the location of the upper nozzle 18 and lower nozzle 20 (FIG. 2) of each assembly. The assemblies 12, however, may have radial displacement, during reactor operation, along their length, as a result of flow and temperature induced forces. Prior to reactor operation, the assemblies 12 are loaded into the core 10 closely adjacent one another, and surrounded by a core barrel 22 for former assembly 24. Reactor coolant typically enters the reactor vessel 26 through an inlet nozzle 28, passes down the annular region between the vessel 26 wall and the core barrel 22, is turned 180° in the lower portion of the vessel, passes up through the core 10 at a high velocity, on the order to fifteen feet per second, and exits through the outlet nozzle 30.

Figure 2:
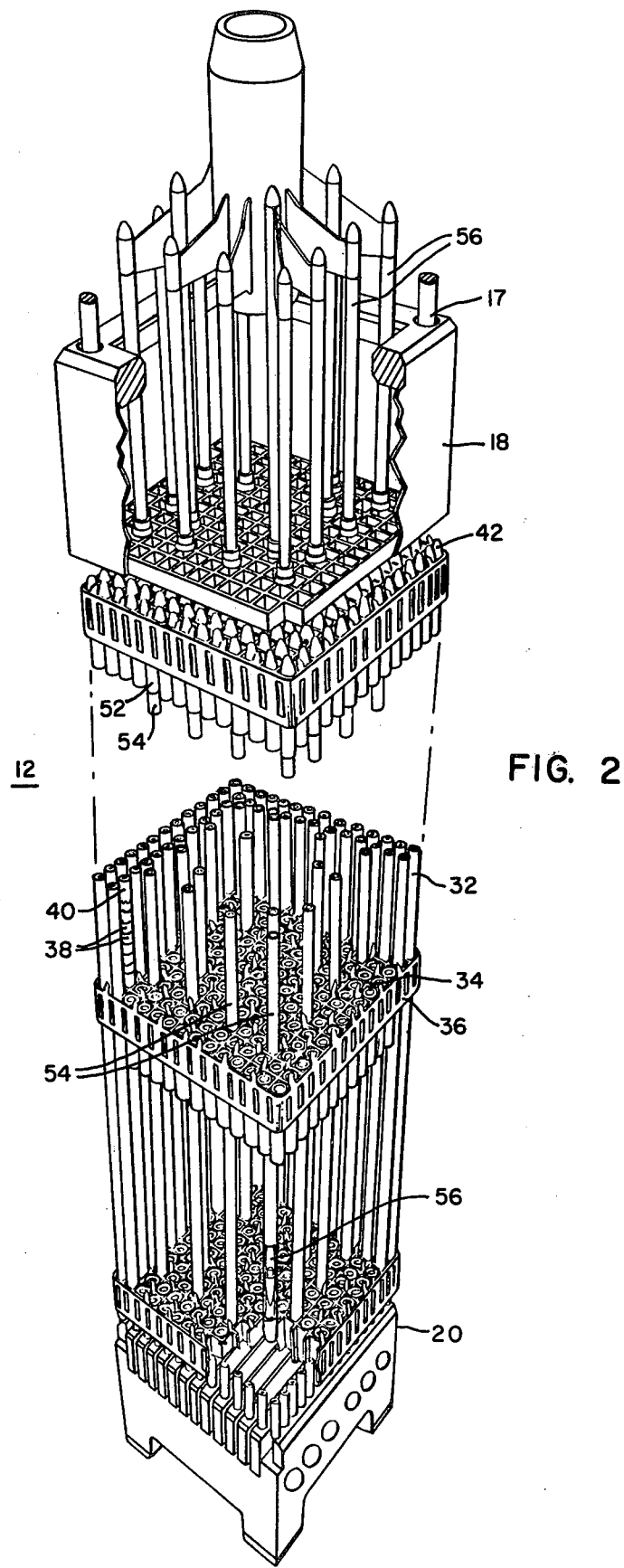
FIG. 2 is a perspective view of a typical nuclear fuel assembly for a liquid cooled reactor.

A typical fuel assembly 12, shown in FIG. 2, comprises a plurality of coextending fuel rods 32 supported at either end by the upper nozzle 18 and lower nozzle 20, and horizontally spaced from one another by spacing means, such as the grids 34 at a plurality of core elevations. The term "core elevation," when used herein and in the appended claims, refers to the axial position within the core that corresponds to the position of a spacing structure or grid, along the assembly length, including the height of the grid outer element, such as a strap 36; for example, if a grid horizontal centerline is positioned fifty inches up from the top of the bottom nozzle, and the height dimension of the outer element of the grid is four inches, then that position between forth-eight and fifty-two inches up from the top of the bottom nozzle is the core elevation. A typical fuel rod 32 includes a plurality of uranium bearing fuel pellets 38 axially stacked within a rod cladding 40 which is hermetically sealed at both extremities by end plugs 42. A typical fuel rod 32 may be as much as sixteen feet in length, or greater, with an outside diameter in the range of one-half inch. The grids 34 function not only to maintain proper lateral alignment and spacing among the rods 32 within a fuel assembly 12, allow for axial growth during reactor heat-up and operation, and control coolant flow, but also to alleviate rod-to-rod contact among fuel rods of the same assembly and also among rods of adjacent fuel assemblies 12. Matched grid core elevations among adjacent assemblies also alleviates concerns regarding coolant cross-flow induced vibration and local flow starvation. It is critical to ensure that any contact among adjacent fuel assemblies 12, which may have a tendency to vibrate and slightly bow, be of a grid-to-grid variety. If such contact is not maintained, there is a likelihood of fretting damage or flow starvation at the point of contact of a rod 32, particularly outermost rods, with another rod 32 or another grid 34. Fretting could possibly lead directly to breach of the cladding 40, and flow starvation could create a local hot spot leading to local cladding 40 melting. Local melting could further lead, in the extreme case, to breach of the cladding 40, thereby allowing reactor coolant to enter the rod, and also allowing the nuclear fuel or fission products to enter the reactor coolant.

Figure 3:
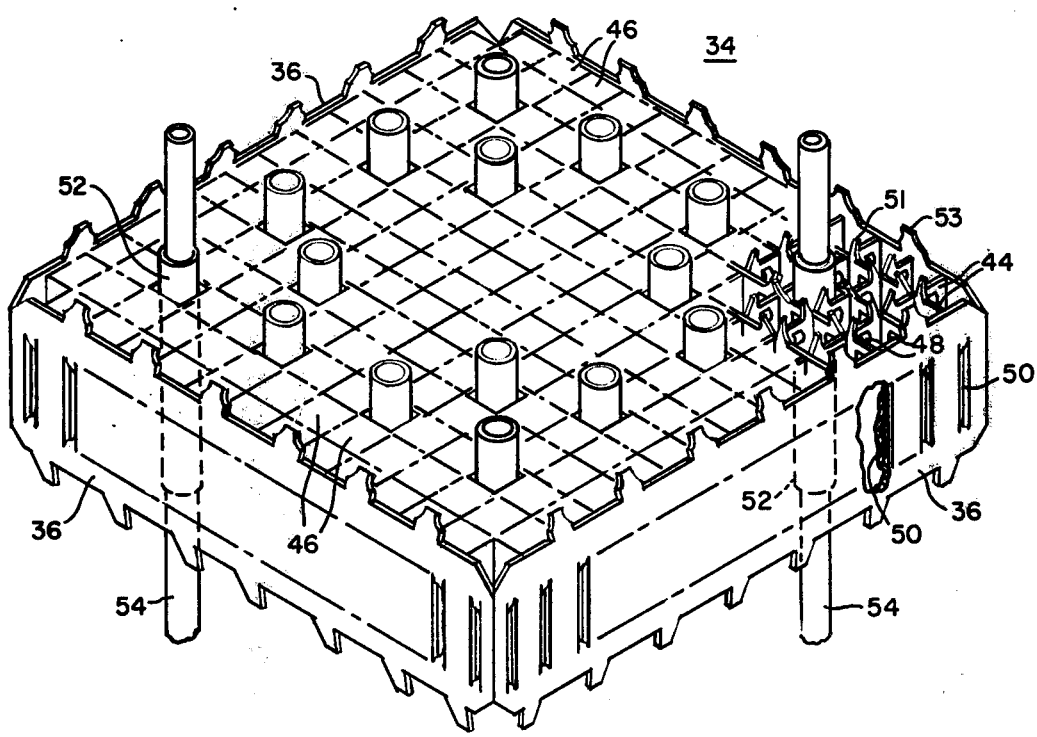
FIG. 3 is a simplified perpsective view of a grid of the assembly of FIG. 2.

For these reasons, all the fuel assemblies 12 within a typical core include spacing structures, or grids, at the same core elevations. A typical grid 34 is shown schematically in FIG. 3. As the art of grid and fuel assembly structures is quite crowded, it is to be understood that the instant invention is compatible with most, if not all, fuel assemblies and grid structures in the art, and is not to be limited by the examples discussed herein. A typical grid 34 is an "egg-crate" type structure, manufactured from a plurality of inner straps 44 and outer straps 36 which form a plurality of grid cells 46. Each cell 46 typically includes support means 48 and spring means 50 which support the rod 32 within the cell 46 while allowing some axial and radial expansion. Also typical are components such as mixing vanes 51 and guide tabs 53, among others. During manufacture of one type of fuel assembly 12, a plurality of cylindrical sleeves 52, which typically extend above and below the grid straps 36, 44, are brazed into each grid 34 at given cell locations. The grids are subsequently aligned in a fixture, and thimble tubes 54 inserted through the aligned sleeves 52. A tool is then inserted through each thimble tube 54 which expands the tube 54 at the sleeve 52 locations, thereby fixing the core elevation of each grid 34. Other means of fixing the grid core elevation may be used. The thimble tubes 54 are typically used for insertion of control elements 56, as shown in FIG. 2.

As discussed above, all assemblies 12 within a core 10 typically include grids 34 at the same core elevation. However, with increasing technology, there is a likelihood that the number of grids 34, the core elevation of grids 34, or the height of the grids in a given core 10, may desirably be modified. Although the grids 34 are typically composed of a low neutron absorption cross section material, such as alloys of zirconium, they do present a parasitic barrier to nuclear efficiency. It is therefore desirable to minimize the amount of grid material in a core. Also, operating experience may show the desirability of added grids for assembly support and to minimize fuel rod bowing, particularly in the lower portions of the assembly. Similarly, grids may be deleted. It will be well recognized that since a core 10 typically is divided into a plurality of regions into which the assemblies 12 are placed and shuffled during refuelings such that a given assembly may be placed in, for example, three different core locations during its operating lifetime, a significant penalty would result if, because of grid core elevation incompatiblity, assemblies 12 would have to be removed from the core 10 and modified or reprocessed prior to obtaining design burnup. The instant invention provides a core and transition fuel assembly which may be utilized without modifying any other fuel assemblies 12 within the core. The transition assembly provides a spacing structure such as a grid 34, or a grid extension, or a partial grid-like structure, at each core elevation where other fuel assemblies in a given core have a grid 34.

The following example is based upon a core 10 which initially includes assemblies 12 with grids 34 at seven core elevations, and is desirably modified to include fuel assemblies 12 with grids 34 at eight core elevations. The basic principle of the instant invention is, however, equally applicable to a decreased number of grids, or merely a change in core elevation of the same number of grids. This example, therefore, is to be viewed as illustrative, and not in a limiting sense. The cored is divided into three core regions, denoted by the letters "A," "B," and "C" on FIG. 4. All three regions initially include seven-grid assemblies when, for example, it becomes desirable to change to assemblies having eight grids. At the next refueling, region "C," which has achieved its desired operating life, is removed for reprocessing. Region "B" fuel assemblies are then shuffled into region "C," and region "A" assemblies are shuffled into region "B." Transition fuel assemblies are then placed in region "A". The transition assemblies are thus placed adjacent region "A" and region "B" assemblies, such that any contact is of a grid-to-grid variety. At the next refueling, region "C" assemblies (seven-grid) are removed, region "B" assemblies (seven-grid) are shuffled to region "C," region "A" transition assemblies are shuffled to region "B," and fresh eight-grid assemblies are placed in region "A." The transition assemblies not maintain contact with both eight-grid and seven-grid assemblies in a grid-to-grid fashion. Dependent upon the core loading pattern, there may be some locations, particularly at the outer portions of the core, where a region "A" assembly (eight-grid) would be adjacent a region "C" assembly (seven-grid), as shown by the dotted line on FIG. 4. At such locations, second transition assemblies would have to be inserted in place of the fresh region "A" (eight-grid) assemblies. The transition assemblies placed in region "B" are subsequently shuffled into region "C," and finally out of the core for reprocessing. The second transition assemblies would subsequently be shuffled into region "B" and then region "A." Upon discharge, the core will the contain only eight-grid assemblies. Because the exact number of assemblies may vary slightly among core regions, there may be instances where one or more assemblies may have to be prematurely discharged, but not premature removal of a whole region or a whole core.

Figure 5:
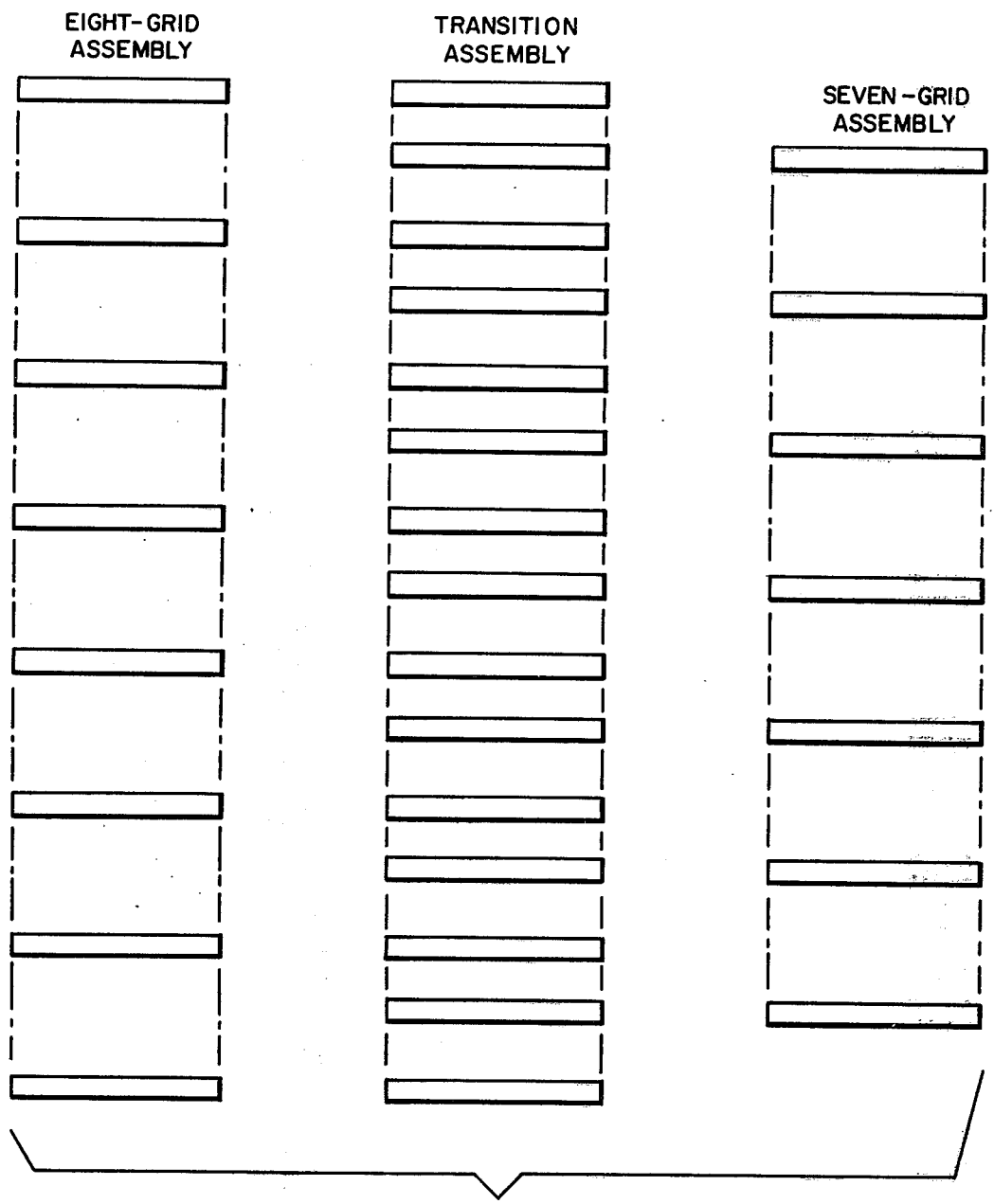
FIG. 5 is a schematic representation of grid core elevations for a seven-grid, eight-grid, and transition assembly.

One embodiment of a transition assembly for the example seven-grid to eight-grid changeover is schematically shown in FIG. 5. The rectangles represent the core elevations of the grids on the three types of assemblies. In this instance, all of the grid core elevations of the eight-grid assemblies are different than the grid core elevations of the seven-grid assemblies, without overlap. If the grids of the two types are all of the same height, the transition assembly can comprise fifteen grids, also of the same height. If the eight-grid assembly grid height is different from the seven-grid assembly grid height, the transition assembly can comprise seven grids corresponding to the seven-grid assembly, and eight grids corresponding to the eight-grid assembly.

Figure 6:
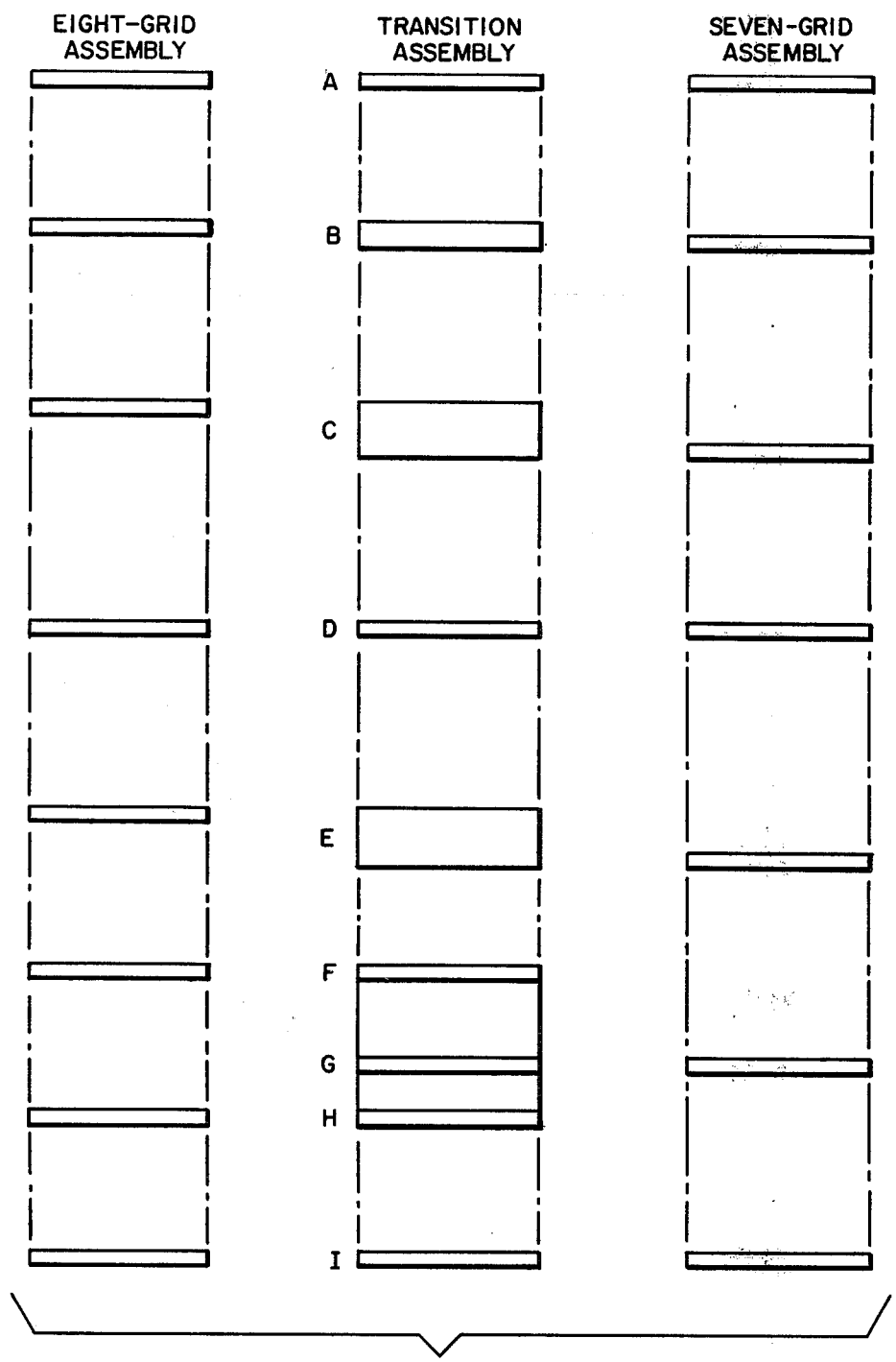
FIG. 6 is also a schematic representaion of grid core elevations for a seven-grid, eight-grid and transition assembly.

It is unlikely, however, that the grid core elevations would not overlap or be within several inches of another at some elevations. FIG. 6 represents these conditions. The eight-grid and seven-grid assembly grids are of the same height, although they may also be different, and the transition assembly comprises nine grids, designed "A" through "I." Grids "A," "D" and "I" may, in this example, be identical to the eight-grid and seven-grid assembly grids in respective core elevation and design. Grids "F," "G," and "H" could also be identical in core elevations with the respective aligned seven-grid assembly grids and eight-grid assembly grids, or as discussed further below, may comprise auxiliary grid structures. Grids "B," "C," and "E" may comprise extended grid structures, also discussed below.

Figure 7:
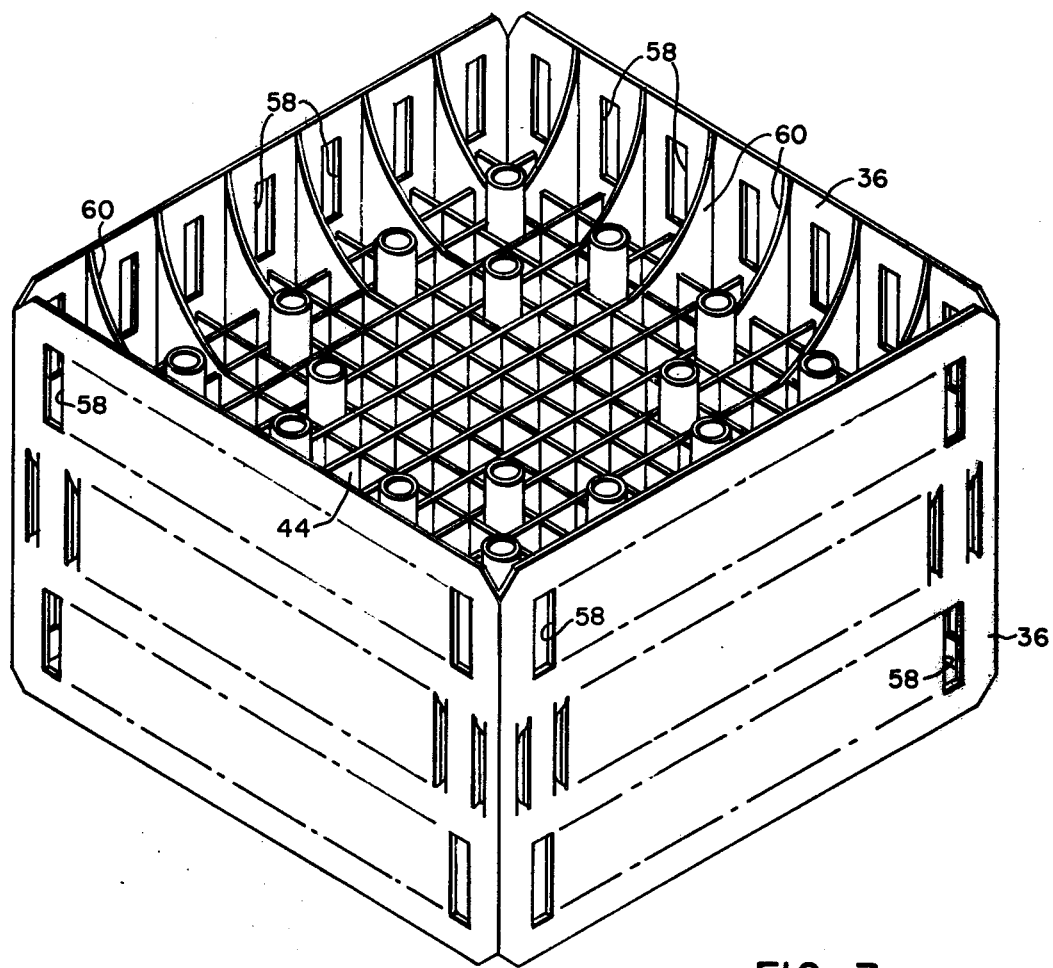
FIG. 7 is a simplified perspective view of an extended transition grid of a transition assembly.

FIG. 7 shows a grid structure referred to above as an extended grid structure. As shown, it is generally similar to a typical spacing structure or grid 34, with the addition of vertically extended outer strips 36. A separate piece attached to a standard grid may also be used. The straps are enlarged in the height dimension to maintain grid-to-grid contact among fuel assemblies 12 with grids 34 at relatively close or overlapping core elevations. To minimize the amount of neutron parasitic material in the core, the extended grid may include openings 58. As the extended portion of the outer strap 36, which may be above, below, or above and below the standard portion of the grid, does not necessarily have to provide significant structural ability to the grid, the openings 58 do not detract from necesary structural integrity. It is desirable, however, to orient the openings 58 such that the outermost portions of the outer fuel rods remain enclosed by the extended portion of the outer straps 36. Depending upon the amount of extension necessary, inner butresses 60 may be used to minimize any vibration of the extended portion. The butresses 60 may be separate components, or extensions of the inner straps 44 brazed to the outer straps 36, as shown.

Figure 8:
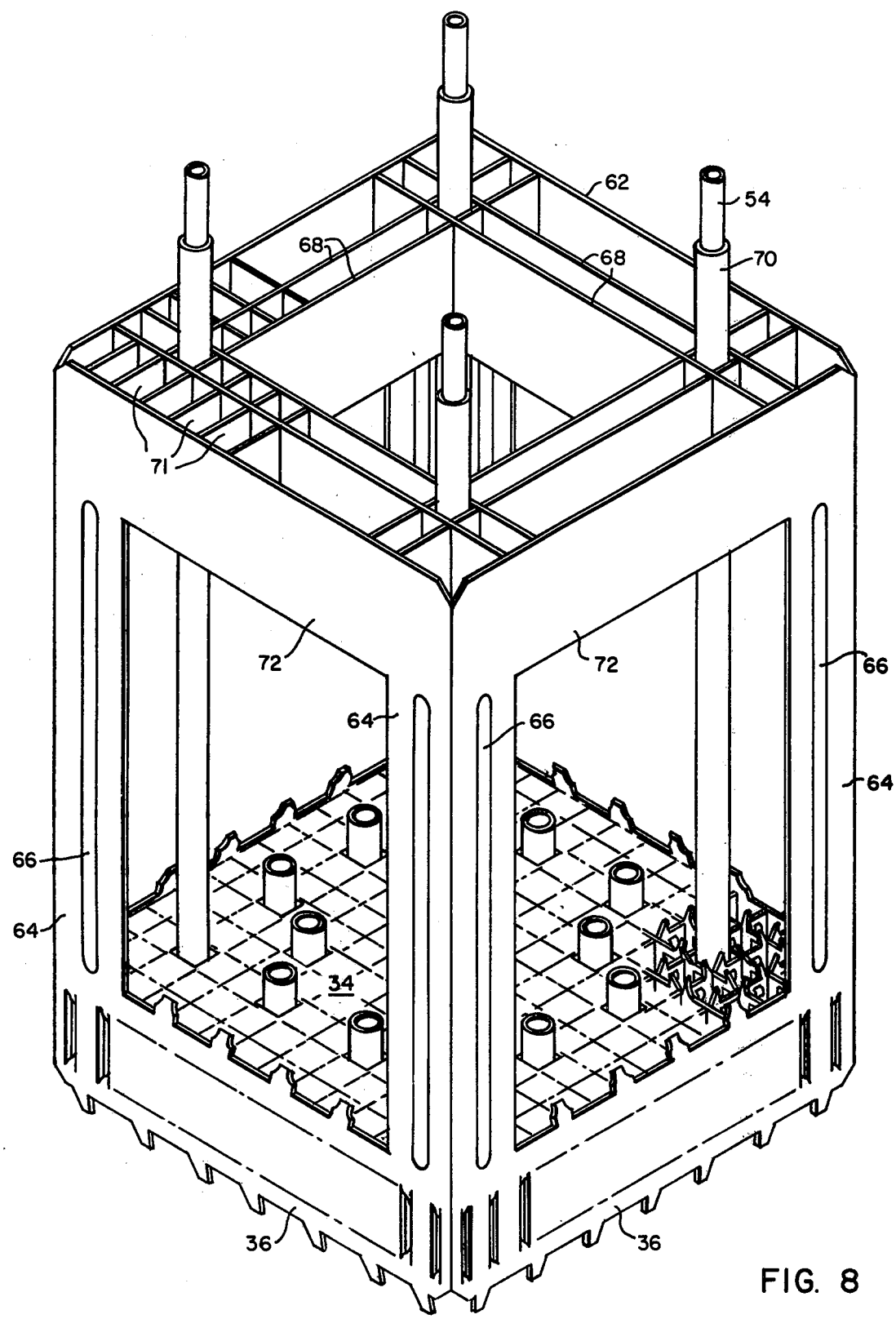
FIG. 8 is a simplified perspective view of an auxiliary grid, affixed by extended outer straps to a typical grid, for a transition assembly.

FIG. 8 shows a grid structure referred to above as an auxiliary grid structure, as may be used at the locations "F," "G," and "H" of FIG. 6. Here, an auxiliary grid 62 is spaced apart from and affixed to a typical spacing grid 34 by partially extended outer straps 64, which may be integrally formed with the standard grid outer strap 36. They may also be a separate component affixed to the outer strap 36. Partially extended refers to the fact that only a portion of the outer strap 36 is extended upward, or downward, or both, preferably at the strap 36 extremities, thereby minimizing the amount of added parasitic material. Stiffening means 66, such as a punched section or an attached member may be used to increase structural strength. The auxiliary grid 62 further includes at least several auxiliary inner straps 68 to maintain necessary support. Grid-to-grid contact at the auxiliary grid is desirably transmitted to four or more thimble tubes 54 through the partial grid network formed by the straps 68 and through the auxiliary sleeves 70. The sleeves 70 may be brazed to the straps 68. The auxiliary grid may also include partial support straps 71 to provide additional support to the upper horizontal portion 72 of the partially extended outer straps 64. A plurality of inner straps extending across the auxiliary grid 62 would unnecessarily add parasitic material to the core. Other means of affixing the auxiliary grid to the assembly, at a given core elevation, may be utilized. Although the auxiliary grid 62 is shown in FIG. 8 extending above a typical spacing grid, it could alternatively extend above, below, or both above and below the grid. Further, the auxiliary grid 62 may include any of the features typically included in a spacing structure, such as retention means, spring means, mixing vanes, and guide structures, among others.

Figure 9:
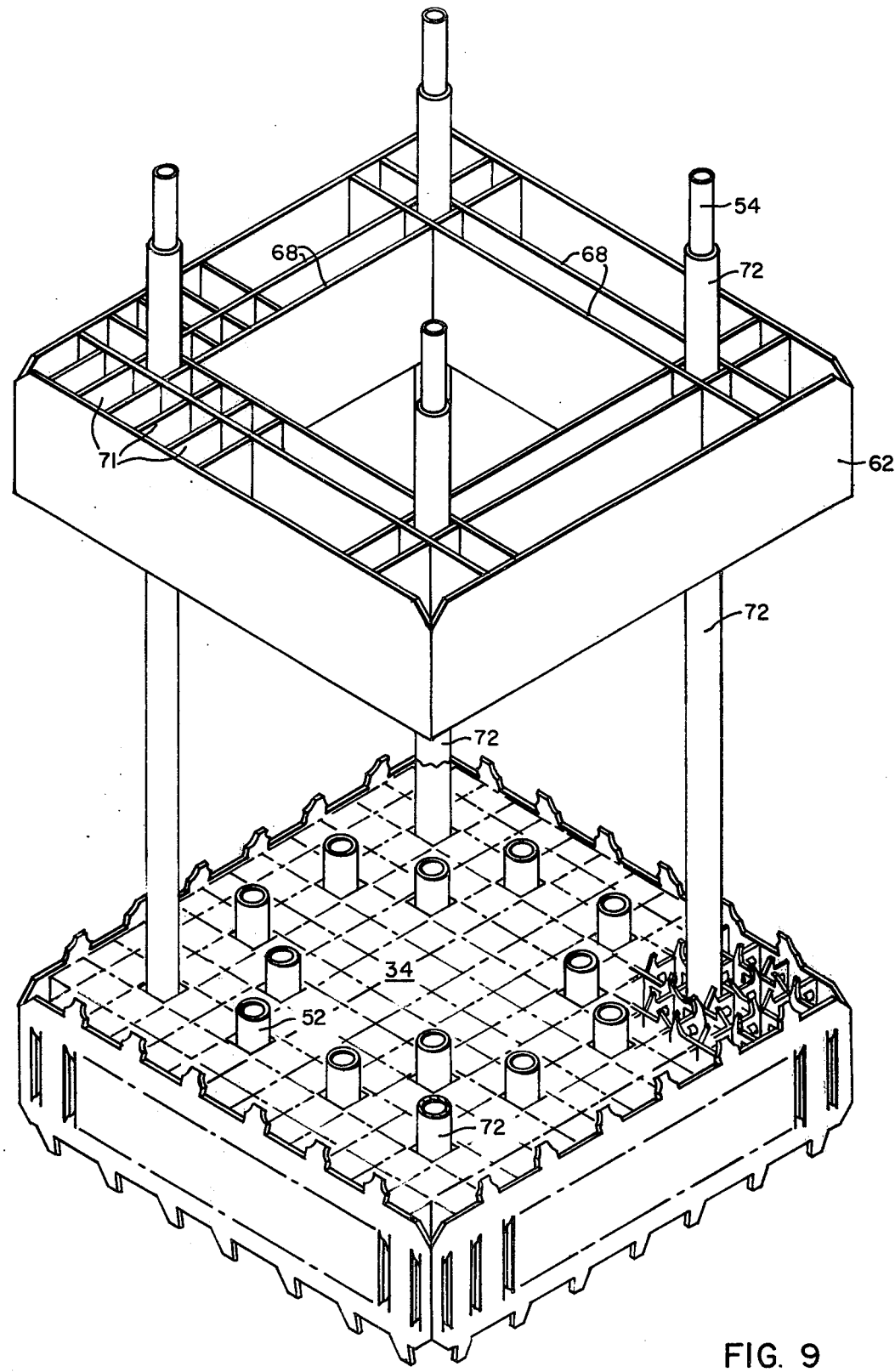
FIG. 9 is a simplified perspective view of an auxiliary grid, affixed by extended sleeves to a typical grid, for a transition assembly.

FIG. 9 shows another auxiliary grid structure. In this instance, the auxiliary grid is spaced from and affixed to a typical spacing grid 34, and hence the assembly, by extended sleeves 72. The thimble tubes 54 are expanded at locations inside the extended sleeves 72, which are brazed to the auxiliary inner straps 68. The features of the auxiliary grid 62 may include any of those discussed in reference to FIG. 8, above. An advantage of the structure shown in FIG. 9 is that it eliminates a number of full length inner straps by utilization of the auxiliary straps 60 and partial straps 71.

It is therefore seen that the instant invention provides a core and a transition fuel assembly which may be used in a nuclear core with fuel assemblies that include spacing structures or grids at differing, or overlapping, core elevations. Although several example grid structures and transition assemblies have been discussed, it will be apparent that many modifications and variations are possible in view of the above teachings. It is therefore to be understood that within the scope of the appended claims, the invention may be practiced other than as specifically described.

We claim:

1. A core for a nuclear reactor comprising:
a vertically oriented first fuel assembly including a plurality of generally parallel coextending fuel rods and structures for laterally spacing said rods positioned at first preselected core elevations, said structures including straps bounding the lateral periphery of said assembly at said first core elevations;
a vertically oriented second fuel assembly including a plurality of generally parallel coextending fuel rods and structures for laterally spacing said rods positioned at second preselected core elevations, said structures including straps bounding the lateral periphery of said second assembly at said second elevations, at least one of said second preselected core elevations being different than all of said first preselected core elevations; and
a vertically oriented transition fuel assembly positioned adjacent and between said first and second fuel assemblies, said transition assembly including a plurality of generally coextending parallel fuel rods and structures for laterally spacing said rods, said structures including means for bounding the lateral periphery of said transition assembly at said first and second preselected core elevations, said means being of sufficient size along the assembly length such that any contact among the rodded length of said adjacent assemblies is initially through said structures.

2. A core for a nuclear reactor comprising:
a plurality of first fuel assemblies, each said first assembly including fuel rods laterally spaced by a plurality of first grid structures positioned at first core elevations, said grid structures each forming a boundary about the periphery of each said fuel assembly at said first elevations;
a plurality of second fuel assemblies, each said second assembly including fuel rods laterally spaced by a plurality of second grid structures positioned at second core elevations, at least one of said first core elevations being different than all of said second core elevations, said second structures each forming a boundary about the periphery of each said fuel assembly at said second elevations; and
at least one transition fuel assembly positioned adjacent a first assembly and adjacent a second assembly comprising a plurality of parallel laterally spaced fuel rods and transition grid structures each forming a boundary about the periphery of said transition fuel assembly, said transition grid structures being positioned such that a transition grid structure is at each said first core elevation and a transition grid structure is at each said second core elevation and such that each first and second grid structure is laterally adjacent a transition grid structure.

3. The core of claim 2 wherein at least one of said transition grid structures includes outer straps having a length along the assembly elevation greater than the length of each said first and second grid structures.

4. The core of claim 3 wherein said outer straps include openings adapted to permit the flow of coolant therethrough.

5. The core of claim 2 wherein at least one of said transition grid structures comprises a partial auxiliary grid structure, said partial auxiliary grid structure comprising auxiliary outer straps about the periphery of said transition assembly affixed to periphery straps of a grid structure similar to said first grid structure by extended peripheral straps along the transition assembly length, and a plurality of auxiliary inner straps forming cells about a selected subplurality of said rods of said transition assembly.

6. The core of claim 5 wherein said partial auxiliary grid structure further comprises auxiliary sleeves affixed within a selected plurality of said cells, said auxiliary sleeves extending to and affixed within cells of another grid structure.

7. The core of claim 2 wherein said grid structures are of a material comprising alloys of zirconium.

8. A core for a nuclear reactor, said core comprising a plurality of fuel assemblies, each said assembly comprising a plurality of parallel coextending fuel rods and a plurality of grid structures for laterally spacing said rods, said fuel assemblies including a first plurality of assemblies including first grid structures at first core elevations, a second plurality of assemblies including second grid structures at second core elevations, at least one of said second core elevations being different than all of said first core elevations, and at least one transition fuel assembly positioned adjacent a first assembly and adjacent a second assembly including transition grid structures sized and positioned such that laterally adjacent each first and second grid structure is a transition grid structure, and laterally adacent each transition grid structure is a first grid structure and a second grid structure.

9. A transition fuel assembly for a core of a nuclear reactor, said core including a plurality of first fuel assemblies having parallel and coextending fuel rods laterally spaced at first preselected core elevations by grid structures each including straps forming the lateral periphery of each said first assembly at said first preselected elevations, a plurality of second fuel assemblies having parallel and coextending fuel rods laterally spaced at second preselected core elevations by grid structures including straps forming the lateral periphery of each said second assembly at said second preselected elevations, at least one of said second preselected core elevations being different than all of said first preselected core elevations, said transition fuel assembly comprising parallel and coextending fuel rods laterally spaced by grid structures, said last named grid structures each including straps forming the lateral periphery of said transition assembly at selected elevations, said straps being sized and positioned so that upon placement of said transition assembly in said core laterally adjacent a first and second fuel assembly, each said last-named grid structure is laterally adjacent a first assembly grid structure and a second assembly grid structure and such that laterally adjacent each first and second assembly grid structure is a grid structure of the transition assembly.

* * * * *